United States Patent [19]

Scalera et al.

[11] 4,351,452

[45] Sep. 28, 1982

[54] TURRET CUP SUPPLY AND DELIVERY APPARATUS

[75] Inventors: Frank T. Scalera, Maplewood; Andris C. Sloss, Sussex, both of N.J.

[73] Assignee: Rowe International, Inc., Whippany, N.J.

[21] Appl. No.: 158,259

[22] Filed: Jun. 10, 1980

[51] Int. Cl.[3] ........................ B65H 7/00; B65G 59/00

[52] U.S. Cl. ........................ 221/11; 221/103; 221/121; 221/197

[58] Field of Search .................. 221/11, 17, 103, 104, 221/197, 119, 121, 122

[56] References Cited

U.S. PATENT DOCUMENTS

| | | | |
|---|---|---|---|
| 2,394,262 | 2/1946 | Reifsnyder | 221/104 X |
| 2,860,817 | 11/1958 | Bell | 221/11 |
| 2,925,196 | 2/1960 | Stoner | 221/11 X |
| 3,075,669 | 1/1963 | Lotspeich | 221/11 X |
| 3,506,156 | 4/1970 | Hanson et al. | 221/11 |
| 3,807,600 | 4/1974 | Moss et al. | 221/11 |

*Primary Examiner*—Allen N. Knowles

*Attorney, Agent, or Firm*—Shenier & O'Connor

[57] ABSTRACT

A cup delivery and turret indexing arrangement in which a motor receives a signal indicating that a cup is to be delivered to drive its shaft first to actuate a cup drop ring over which one turret column is positioned and to release a cup supply sensing arm which moves to permit a full cycle switch to close. When the last cup at a predetermined column level has been dropped, the arm moves to position a turret drive slide in the path of a crank pin driver by the shaft to rotate the turret to position a fresh column over the cup drop ring.

9 Claims, 4 Drawing Figures

TURRET CUP SUPPLY AND DELIVERY APPARATUS

FIELD OF THE INVENTION

Our invention relates to an improved turret cup supply and delivery mechanism and, more particularly, to a cup supply for use in a merchandiser machine adapted to dispense beverages.

BACKGROUND OF THE INVENTION

There are known in the prior art merchandising machines which are adapted to dispense beverages in response to the deposit of money in the machine and the actuation of a selection button. One of the subassemblies of each of these machines of the prior art is a cup dispensing unit which is adapted to deliver cups one by one from a supply. Most of these cup-delivery mechanisms of the prior art include a plurality of radially moveable elements which support a column of cups above a chute, or the like, leading to the delivery location at which the beverage is received by the customer. These cup-delivery devices include a ring which is adapted to be rotated through a given angular displacement to withdraw the radially moveable members to release one cup at a time from the column.

In addition to the cup-delivery mechanism described above, most of the machines of the prior art include a turret which is adapted to hold a plurality of columns of cups, one column of which is positioned over the delivery mechanism. When the cups in the one column are depleted a fresh column of cups moves into position over the cup delivery ring.

While these cup-delivery mechanisms of the prior art described hereinabove function fairly satisfactorily, they suffer from a number of defects. Most of them are relatively complicated in construction and hence somewhat uncertain in operation. A number of them require individual electromechanical elements for operating the cup-delivery mechanism and for operating the turret rotating mechanism. Many of the mechanisms are not adapted for interchangeable use with the different cup-delivery rings known in the prior art. They do not facilitate interchangeable use with turrets having different numbers of columns.

SUMMARY OF THE INVENTION

One object of our invention is to provide an improved turret cup supply and delivery apparatus which overcomes the defects of cup-delivery and supply assemblies of the prior art.

Another object of our invention is to provide an improved turret cup supply and delivery apparatus which is simpler than are mechanisms of the prior art intended to achieve the same purpose.

A still further object of our invention is to provide an improved turret cup supply and delivery apparatus in which a single electromagnetic device operates both the cup drop and the turret drive.

Yet another object of our invention is to provide an improved turret cup supply and delivery apparatus which can be interchangeably used with various cup-delivery rings available from the prior art.

Still another object of our invention is to provide an improved turret cup supply and delivery apparatus in which the danger of cup jamming is minimized.

Yet another object of our invention is to provide an improved turret cup supply and delivery apparatus in which the indexing position is relatively easily adjusted.

Yet another object of our invention is to provide an improved turret cup supply and delivery apparatus for use with turrets having different numbers of columns.

A still further object of our invention is to provide an improved turret cup supply and delivery apparatus which is lighter in weight than are systems of the prior art.

Other and further objects of our invention will appear from the following description:

In general our invention contemplates the provision of a cup delivery and turret indexing arrangement, in which a motor receives a signal indicating the cup is to be delivered to drive its shaft first to actuate a cup drop ring and to release a cup supply sensing arm which moves to permit a full cycle switch to close. When the last cup has been dropped the arm moves to position a turret drive slide in the path of a crank pin driven by the motor shaft to rotate the turret to position a fresh column of cups over the cup-delivery ring. We provide our system with means for accurately positioning the turret column relative to the cup-delivery ring.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
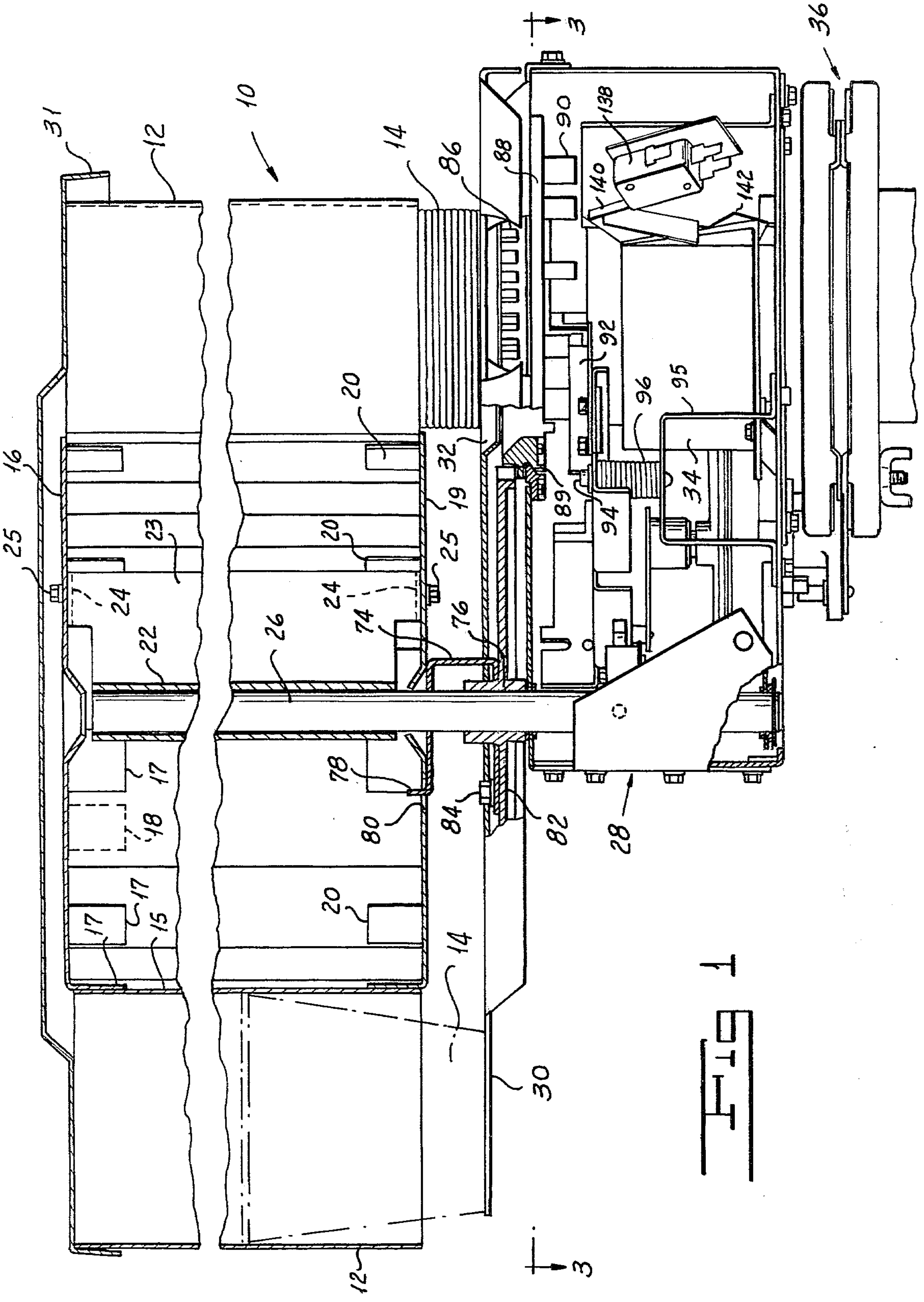
FIG. 1 is an elevation of our improved turret cup supply and delivery apparatus with parts broken away and with other parts shown in section.
Figure 2:
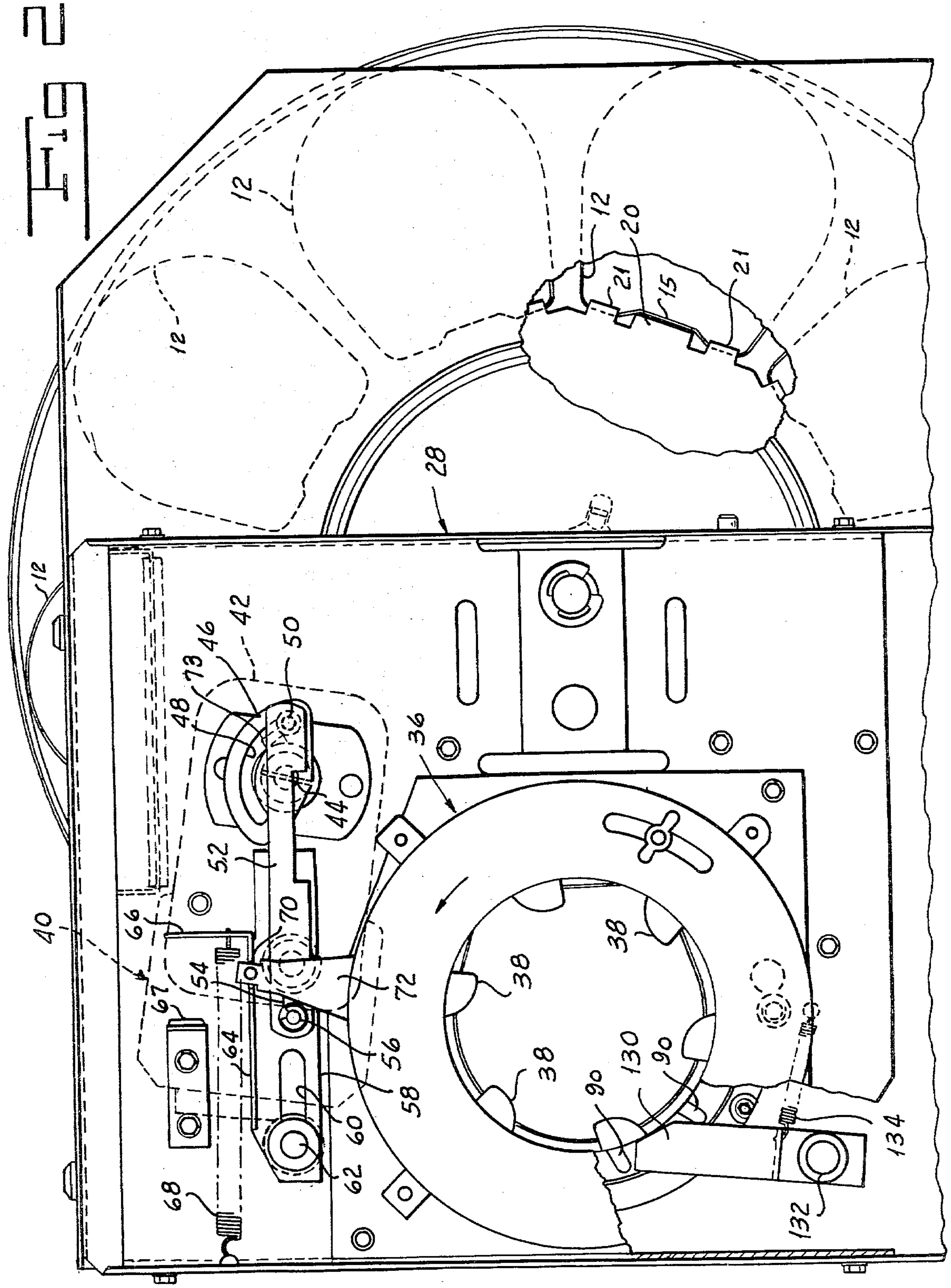
FIG. 2 is a bottom plan view of the form of our improved turret cup supply and delivery apparatus illustrated in FIG. 1.
Figure 3:
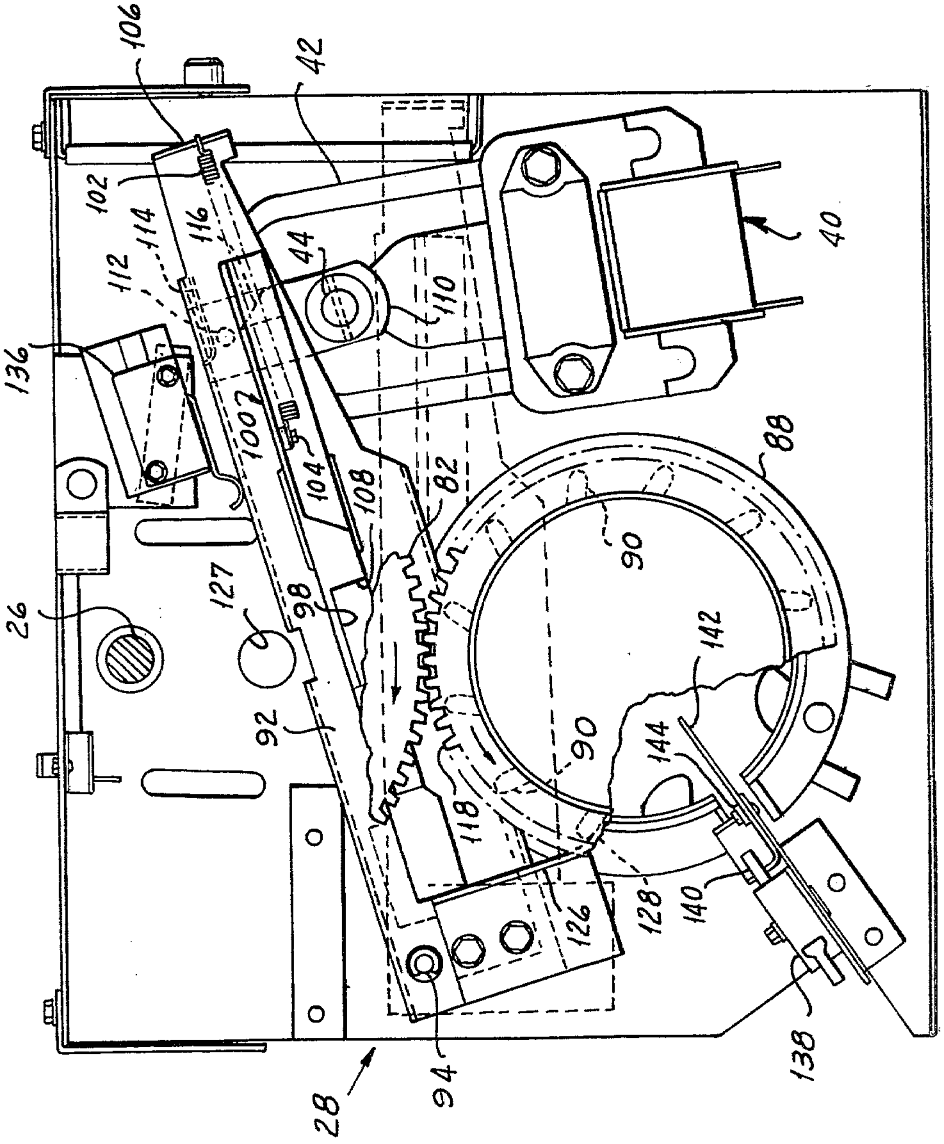
FIG. 3 is a sectional view of the form of our improved cup turret supply and delivery apparatus shown in FIG. 1 and taken along the line 3—3 thereof.

Referring now to FIGS. 1 to 3 of the drawings, our apparatus includes a turret indicated generally by the reference character 10 made up of a number of tubes 12 adapted to receive respective columns of cups 14. We form an inboard wall portion 15 of each of the tubes 12 in such a manner that a lug 17 extending downwardly from an upper plate 16 engages the outside of wall portion 15 and respective lugs 18 extending downwardly from the plate 16 at each side of a lug 17 engage the inner surface of the wall portion 15. Similarly, a lower plate 19 has a lug 20 associated with each tube 12 which extends upwardly so as to engage the outer surface of wall portion 15, while a pair of lugs 21 extending upwardly from the bottom plate 19 at the sides of the lug 20 engage the inner surface of the wall portion 15 of tube 12. In this manner, the tubes 12 are held in position on the turret. A central tubular member 22 of the turret carries one or more radially extending arms 23, the upper and lower ends of which are provided with flanges 24 to which the plates 16 and 19 can be secured by any suitable means, such for example as by screws 25, or the like. A spindle 26 supported on a stationary housing or frame 28 secured to the machine (not shown) with which the cup dispenser is used receives the tube 22 to position the turret, so that the supplies of cups 14 in the tubes 12 are supported on a plate 30. Preferably, the turret 10 is provided with a cover 31 resting on top of the tubes 12.

As will be explained more fully hereinbelow, in the normal position of the turret 10, one of the tubes 12 registers with an opening 32 in the plate 30, so that the column of cups 14 is permitted to drop downwardly through a guide 34 to a cup-delivery ring assembly indicated generally by the reference character 36. Since this assembly per se forms no part of our invention, it will not be described in detail. As is known in the art, the assembly 36 includes a plurality of cams or fingers 38 which normally support the column of cups but which are withdrawn upon actuation of the assembly 36 to permit one cup to drop from the bottom of the column. An example of one form of actuatable delivery ring which might be incorporated in our assembly is shown and described in Atwood et al. U.S. Pat. No. 3,071,292.

Our apparatus includes a motor indicated generally by the reference character 40 which, in a manner known to the art, receives an electrical signal at a time at which a cup is to be delivered by the assembly 36. Motor 40 drives a reduction gear box 42 having a double ended output shaft 44. The downwardly extending end of shaft 44 carries for rotation therewith a releasing member 46 for the drive for assembly 36. Member 46 has an arcuate slot 48 which receives a pin 50 carried by a link 52. A slot 54 in the link 52 receives a pin 56 carried by a drive link 58 supported for movement on the underside of the frame 28 by one or more pin and slot connections including a slot 60 in the link and a pin 62 on the frame 28. A downwardly extending flange 64 running along one side of the link 58 has an offset 66. A spring 68 connected at one end to the offset 66 and at the other end to the frame 28 normally urges link 58 to move to the left as viewed in FIG. 2. A notch 70 in the flange 64 is adapted to receive the end of an arm 72 forming part of the mechanism 36.

In the rest position of the parts just described the pin 50 is held in the position shown in FIG. 2 by a stationary cam 73, thus to inhibit the action of spring 68. However, as soon as shaft 44 begins to rotate in a counterclockwise direction as viewed in FIG. 2, pin 50 moves radially outwardly past cam 73 and spring 68 is permitted to act rapidly to move link 58 and link 52 to the left as viewed in FIG. 2 until offset 66 strikes a bumper 67. In the course of this movement, arm 72 is moved in a counterclockwise direction to operate the mechanism 36 to withdraw the fingers 38 to permit a cup to drop to the delivery location. In a manner to be described hereinbelow, the circuit of motor 44 is maintained for a single revolution of shaft 44 upon completion of which the parts are restored to the position shown in FIG. 2. It is to be understood that the description of the means for operating the mechanism 36 outlined hereinabove is by way of example only. It may be that where a different ring assembly is used a different direction of drive may be required.

Referring again to FIGS. 1 and 3, a bracket 74 is formed with a lug 78 which is received in an opening 80 in the plate 19. Any suitable means, such for example as a screw 84 secures a turret drive gear 82 to the bracket 74. Loosening of screw 84 permits adjusting the rotary position of turret 10 on gear 82. Gear 82 has a hub 76 surrounding shaft 26. We secure a gear 86 which meshes with gear 82 to a turret drive ring 88 for rotation therewith. A suitable bearing ring 89 supports the assembly of gear 86 and ring 88 in the upper wall of frame 28 in registry with the opening 32, so that cups from a column can pass through the assembly of the gear 86 and the drive ring 88. We form drive ring 88 with a number of circumferentially spaced downwardly extending lugs 90 adapted to be driven in a manner to be described to advance the turret 10 through an angular distance equal to the distance between a pair of tubes 12 when the supply of cups in the tube 12 which is positioned over opening 32 is exhausted.

Our structure for actuating the ring 88 includes an arm 92 supported for pivotal movement on a pin 94 carried by a bracket 95 welded to frame 28. A torsion spring 96 normally urges the arm 92 to rotate in a clockwise direction around pin 94 as viewed in FIG. 3. A slot 98 extending along arm 92 slideably receives an actuator ring-driving slide indicated generally by the reference character 100. A spring 102 extending between a pin 104 on slide 100 and a flange 106 on the end of arm 92 remote from pin 94 normally urges the slide to a right-hand limit position as viewed in FIG. 3. When the supply of cups in a column 12 disposed over opening 32 is depleted a surface 108 on the slide 100 is positioned to engage a lug 90 when the slide is driven to the left as viewed in FIG. 3 in a manner to be described.

The upwardly extending portion of shaft 44 carries a crank arm 110 for rotation therewith. Arm 110 supports a pin 112 which, in the rest position of the parts, is engaged by a flange 114 on arm 92 to hold the arm in position against the action of spring 96 to relieve the pressure of the arm 92 on the cups.

When the motor 40 is energized, shaft 44 rotates in a clockwise direction as viewed in FIG. 3. This action frees arm 92 to permit the arm to swing in a clockwise direction. If the supply of cups in the column 12 positioned over the opening 32 has not reached a predetermined low level, the movement of arm 92 will be arrested by the cups in the column. If, on the other hand, a supply of cups has reached a predetermined low level, so that the movement of arm 92 is not impeded by the cups in the column, the arm will move to the broken line position illustrated in FIG. 3. In this position of the arm, a boss 116 on the underside of slide 100 is in a position to be engaged by crank pin 112. When that occurs, the slide is moved from right to left as viewed in FIG. 3 to cause the surface 108 to engage a pin 90 to produce a predetermined angular movement of the ring 88. This angular movement of the ring causes gear 86 to drive gear 82 through an angular displacement equal to half the angular spacing of a pair of adjacent tubes 12. Thus two cup drops are necessary to achieve column replacement. In the particular arrangement illustrated in FIGS. 1 to 3, nine columns of cups are provided, so that the angular displacement necessary to replace one column with an adjacent column is 40°. It is to be understood that the action of dropping the bottom cup of the column takes place very rapidly after the initial displacement of shaft 44. The dropping action is completed before pin 112 permits any appreciable angular displacement from its home position. Stated otherwise, the configuration of flange 114 and its relationship to pin 112 is such that no appreciable pivotal movement of arm 92 is permitted until the cup dropping operation is complete.

Figure 4:
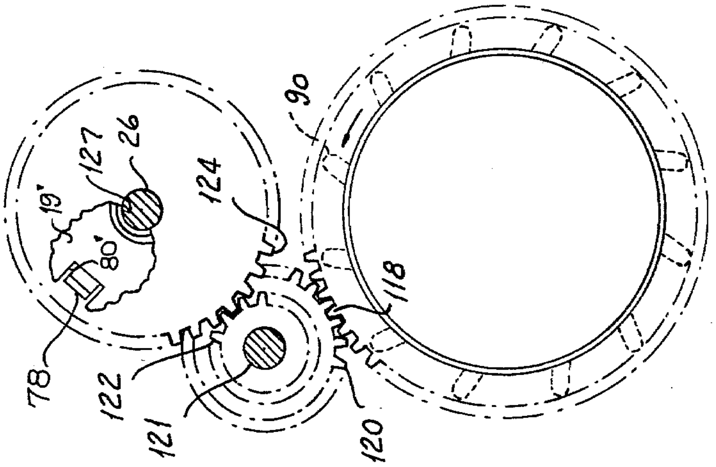
FIG. 4 is a fragmentary view illustrating an alternate embodiment of our improved turret cup supply and delivery apparatus.

Referring now to FIGS. 3 and 4, in an alternative embodiment of our turret assembly in which we provide six columns of cups, means including an opening 127 in the top of the frame 28 supports spindle 26. In this embodiment, we replace the gear 82 with a gear 124 secured to the bracket 74 in the same manner as that outlined hereinabove in connection with the embodiment illustrated in FIGS. 1 to 3. That is, the alternate six column turret base plate 19' is provided with an opening 80' for receiving the lug 78 to couple the reduced capacity turret to the shaft 26. In the alternative embodiment, the gear 118 drives an intermediate gear 120 supported on a common shaft 121 which carries gear 122 for rotation therewith. Gear 122 drives the gear 124. It will readily be apparent that in this alternative embodiment, the turret is rotated in a direction which is opposite to that in which it is rotated in the embodiment illustrated in FIGS. 1 to 3. Moreover, since there are only six columns of cups in this instance, we rotate the turret through 60° each time the column of cups is to be replenished.

In both forms of our invention, we provide the arm 92 with a flange 126 carrying a tab 128 which prevents overtravel of the ring 88 in the direction in which it is driven to replace the column of cups. Referring again to FIG. 2, a pawl 130 pivotally supported on a pin 132 is urged by a spring 134 to a position at which it engages ring 88 between a pair of adjacent lugs 90 accurately to locate the ring.

As the shaft rotates in a clockwise direction as viewed in FIG. 3, arm 92 is permitted sufficient movement in a clockwise direction even in the presence of cups above a predetermined level to release a full cycle switch 136 which completes the circuit of motor 40 for a full revolution of shaft 44. When the pin 112 moves back to its home position, it gain engages the flange 114 to restore the arm 92 to its initial position and to open the full cycle switch 136.

We provide our cup supply with an empty signal switch 138 having an actuating arm 140. A feeler 142 mounted for pivotal movement on a pin 144 is adapted to move under the influence of gravity into the guide 34 when the last cup from the turret 10 has been delivered. When this occurs, finger 142 moves into the guide and the upper end thereof swings to a position at which it actuates switch arm 140 to disable the merchandising machine and to light a signal or the like (not shown) indicated that the machine is out of cups.

It will be seen that we have accomplished the objects of our invention. We have provided an improved turret cup supply which minimizes the possibility of cup jamming. Our supply is easily adjusted for index position. Our cup supply is relatively simple in construction. It requires only a single motor which operates both the cup drop and the turret indexer. Our apparatus is adapted for use with various cup delivery rings of the prior art. It is readily converted from a turret having a greater number of columns to one having a lesser number of columns or vice versa.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A cup supply mechanism for use with a drink machine having a shaft which rotates in the course of each cycle of operation of said machine including in combination a cup dispensing mechanism adapted to be operated to deliver cups one by one from a column of cups positioned in operative relation therewith, a turret for holding a plurality of columns of cups, means mounting said turret with one of said columns, in operative relationship with said dispensing mechanism, an arm, means mounting said arm adjacent to said one column at a predetermined level for pivotal movement between a first position at which said arm is out of said column and a second position at which said arm enters said column in the absence of a cup at said level, means biasing said arm to its second position, a drive slide, means mounting said slide on said arm for reciprocating movement between a retracted position and an extended position, means biasing said slide to said retracted position, respective first and second elements on said shaft and on said slide, said elements adapted to clear each other in the course of rotation of said shaft in the first position of said arm and to engage in the course of rotation of said shaft in the second position of said arm to move said slide to its extended position, and means responsive to movement of said slide to its extended position for moving said turret to position another column in operative relationship with said dispensing mechanism.

2. Mechanism as in claim 1 in which said first element has a home position in the rest condition of said machine and means on said arm engaged by said first element in its home position for holding said arm in a position slightly beyond said first position.

3. A cup supply system for use with a drink machine having a shaft which rotates in the course of each cycle of operation of said machine including in combination a cup dispensing mechanism adapted to be operated to deliver cups one by one from a column of cups positioned in operative relationship therewith, a turret for holding a plurality of columns of cups, means mounting said turret with one of said columns of cups in operative relationship with said dispensing mechanism and for movement to position the other columns in operative relationship with said dispensing mechanism, an arm, means mounting said arm adjacent to said one column at a predetermined level for pivotal movement between a first position at which said arm is out of said column and a second position at which said arm enters said column in the absence of a cup at said level, a drive member mounted for movement on said arm, respective first and second elements on said drive member and on said shaft, said elements adapted to clear each other in the course of rotation of said shaft in the first position of said arm and to engage in the course of rotation of said shaft in the second position of said arm to move said drive member and means responsive to movement.

4. Cup delivery apparatus for use with a drink machine adapted to dispense a drink on each operation thereof, said machine having a shaft which rotates in the course of each cycle of operation of said machine, including in combination a cup dispensing mechanism adapted to be operated to deliver cups one by one from a column of cups positioned in operative relationship therewith, a turret for housing a plurality of columns of cups, means mounting said turret with one of said columns in operative relationship with said cup dispensing mechanism and for movement to bring the other columns thereof into operative relationship with said mechanism, turret moving means comprising an arm, means mounting said arm at a predetermined level for movement between a first position out of said column and a second position in said column in the absence of a cup at said level, said shaft having a home position in the quiescent condition of said machine, means on said shaft in the home position thereof for holding said arm in a position slightly beyond said first position, means responsive to an initial rotation of said shaft for operating said dispensing mechanism, said arm holding means remaining operative during said initial rotation, means responsive to a further rotation of said shaft for rendering said arm holding means inoperative to free said arm and means responsive to a still further rotation of said shaft for operating said turret moving means when said arm is in its second position.

5. Cup delivery apparatus for use with a drink machine adapted to dispense a drink on each operation thereof including in combination, a cup dispensing mechanism adapted to be operated to deliver cups one by one from a column of cups positioned in operative relationship therewith, a turret for housing a plurality of columns of cups, means mounting said turret for movement successively to position said columns in operative relationship with said cup dispensing mechanism, means for operating said cup dispensing mechanism on each cycle of operation of said machine, means including a member mounted for reciprocating movement and adapted to be driven to move said turret to position a fresh column of cups in operative relationship with said cup dispensing mechanism, interengageable means on said member and on said operating means, means mounting said member for movement between a first position at which said interengageable means engage in the course of a cycle of operation of said machine and a second position at which said interengageable means do not engage in the course of a cycle of operation of said machine and means responsive to cups at a predetermined level in a column in operative relationship with said cup dispensing mechanism for holding said member in said second position.

6. Cup delivery apparatus for use with a drink machine adapted to dispense a drink on each operation thereof including in combination, a cup dispensing mechanism adapted to be operated to deliver cups one by one from a column of cups positioned in operative relationship therewith, a turret for housing a plurality of columns of cups, means mounting said turret for movement successively to position said columns in operative relationship with said cup dispensing mechanism, means for operating said cup dispensing on each cycle of operation of said machine, means including a member mounted for reciprocating movement and adapted to be driven to move said turret to position a fresh column of cups in operative relationship with said cup dispensing mechanism, interengageable means on said member and on said operating means for driving said member, said interengageable means being movable between a first relative position at which they fail to engage upon operation of said operating means and a second position at which they engage upon operation of said operating means to drive said turret, and means responsive to the presence of cups at a predetermined level in the column in operative relationship with said delivery means for holding said interengageable means in said first position.

7. Cup delivery apparatus for use with a drink machine adapted to dispense a drink on each operation thereof including in combination, a cup dispensing mechanism adapted to be operated to deliver cups one by one from a column of cups positioned in operative relationship therewith, a turret for housing a plurality of columns of cups, means mounting said turret for movement successively to position said columns in operative relationship with said cup dispensing mechanism, a motor having a shaft, said motor being energized in the course of each cycle of said machine to rotate said shaft, means responsive to rotation of said shaft for operating said cup delivery mechanism, normally disabled means for positively driving said turret from said shaft, and means responsive to a predetermined low level of cups in the column for enabling said normally disabled means.

8. A cup supply system for use with a drink machine provided with a cup dispensing mechanism having a shaft which rotates in the course of each cycle of operation of said machine including in combination a turret for holding a plurality of columns of cups, means mounting said turret with one of said columns of cups in operative relationship with said dispensing mechanism and for movement to position the other columns in operative relationship with said dispensing mechanism, means including a linearly reciprocatable member for moving said turret, normally disabled means for driving said reciprocatable member from said shaft, and means responsive to a predetermined low level of cups in said one column for enabling said normally disabled means.

9. In a drink machine provided with a cup dispensing mechanism adapted to dispense cups one at a time on each cycle of operation of said machine, cup supply apparatus including a first turret adapted to hold a first predetermined number of columns of cups, a second turret adapted to hold a second predetermined number of columns of cups, said second number being different from said first number, means for alternatively and interchangeably mounting said turrets with one column thereof in operative relationship with said cup dispensing mechanism and for movement of the turret to position the other columns in operative relationship with said cup dispensing mechanism, and means responsive to a predetermined low level of cups, said one column for moving the turret holding said one column to position another column in operative relationship with said dispensing mechanism.

* * * * *